(12) United States Patent
Eipper et al.

(10) Patent No.: US 8,440,761 B2
(45) Date of Patent: May 14, 2013

(54) LIGHTING ELEMENTS COMPOSED OF POLYESTERS

(75) Inventors: Andreas Eipper, Ludwigshafen (DE); Martin Weber, Maikammer (DE); Carsten Weiss, Singapore (SG)

(73) Assignee: BASF SE (DE)

( * ) Notice: Subject to any disclaimer, the term of this patent is extended or adjusted under 35 U.S.C. 154(b) by 617 days.

(21) Appl. No.: 11/994,937

(22) PCT Filed: Jul. 13, 2006

(86) PCT No.: PCT/EP2006/064177
§ 371 (c)(1),
(2), (4) Date: Jan. 7, 2008

(87) PCT Pub. No.: WO2007/009926
PCT Pub. Date: Jan. 25, 2007

(65) Prior Publication Data
US 2008/0221259 A1  Sep. 11, 2008

(30) Foreign Application Priority Data
Jul. 21, 2005  (DE) .......................... 10 2005 034 742

(51) Int. Cl.
*C08L 67/00*  (2006.01)
*C08F 12/08*  (2006.01)

(52) U.S. Cl.
USPC ............... 524/513; 315/77; 315/82; 524/549; 524/565; 524/577; 525/165; 525/176; 525/177; 526/342; 526/347

(58) Field of Classification Search ........... 524/513, 524/549, 565, 577; 525/418, 165, 176, 177; 315/77, 82; 526/342, 347
See application file for complete search history.

(56) References Cited

U.S. PATENT DOCUMENTS

| | | | |
|---|---|---|---|
| 4,205,140 A * | 5/1980 | Liebig et al. | 525/67 |
| 5,916,649 A * | 6/1999 | Hegemann et al. | 428/36.92 |
| 6,605,665 B1 * | 8/2003 | Fischer et al. | 524/504 |
| 2005/0113493 A1 * | 5/2005 | Persigehl et al. | 524/99 |
| 2006/0036037 A1 | 2/2006 | Weber et al. | |
| 2006/0094813 A1 | 5/2006 | Warth et al. | |

FOREIGN PATENT DOCUMENTS

| | | |
|---|---|---|
| DE | 19903073 | 8/2000 |
| DE | 10259266 | 7/2004 |
| WO | 9106605 | 5/1991 |
| WO | 2004055107 | 7/2004 |
| WO | 2006040087 | 4/2006 |

OTHER PUBLICATIONS

Intertek Plastics Technology Laboratories, "Fogging Characteristics of Interior Automotive Materials", Jul. 6, 2005.*

* cited by examiner

*Primary Examiner* — Richard A Huhn
(74) *Attorney, Agent, or Firm* — Novak Druce Connolly Bove + Quigg LLP

(57) ABSTRACT

Lighting elements composed of thermoplastic molding compositions comprising
A) from 10 to 99.9% by weight of at least one thermoplastic polyester,
B) from 0.1 to 50% by weight of at least one terpolymer, obtainable from
b1) at least one vinylaromatic monomer,
b2) at least one $C_1$-$C_4$-alkyl (meth)acrylate or (meth)acrylonitrile, and
b3) from 0.1 to 10% by weight, based on the total weight of the components b1) to b3), of at least one monomer which comprises an $\alpha,\beta$-unsaturated anhydride, and
C) from 0 to 60% by weight of other additives,
where the total of the percentages by weight of components A) to C) is 100%.

9 Claims, No Drawings

LIGHTING ELEMENTS COMPOSED OF POLYESTERS

CROSS REFERENCE TO RELATED APPLICATIONS

This application is a National Phase of International Application No. PCT/EP2006/064177 filed on Jul. 13, 2006, which claims priority to Application No. 102005034742.8 filed in Germany on Jul. 21, 2005; the entire contents of all are hereby incorporated by reference.

The invention relates to a lighting element composed of thermoplastic molding compositions, comprising
A) from 10 to 99.9% by weight of at least one thermoplastic polyester,
B) from 0.1 to 50% by weight of at least one terpolymer, obtainable from
 b1) at least one vinylaromatic monomer,
 b2) at least one $C_1$-$C_4$-alkyl (meth)acrylate or (meth)acrylonitrile, and
 b3) from 0.1 to 10% by weight, based on the total weight of components b1) to b3), of at least one monomer which comprises an $\alpha,\beta$-unsaturated anhydride, and
C) from 0 to 60% by weight of other additives,
where the total of the percentages by weight of components A) to C) is 100%.

The invention further relates to specific elements, such as headlamp parts, in particular for motor vehicles, or parts for lamps of any type.

For the purposes of weight reduction in motor vehicles, there is now a variety of individual parts composed of thermoplastics, and in particular of polyesters.

General requirements for lighting elements—irrespective of whether they are for motor vehicles or other applications sectors—are good dimensional stability (low shrinkage) on exposure to thermal stress, good processability and mechanical properties, and also a very low level of fogging, because otherwise, by way of example, reflectors are subject to condensation or short circuits can arise.

By way of example, DE-A 102 59 266 discloses molding compositions which comprise terpolymers of this type, these being used here as compatibilizers.

An object underlying the present invention is therefore to provide thermoplastic polyester molding compositions which have good dimensional stability together with good mechanical properties. In particular, the intention is that fogging performance be improved.

Accordingly, the molding compositions defined at the outset have been found for lighting elements. Preferred embodiments are given in the subclaims.

The inventive molding compositions comprise, as component (A), from 10 to 99.9% by weight, preferably from 30 to 99% by weight, and in particular from 30 to 90% by weight, of at least one thermoplastic polyester.

Polyesters A) used are generally those based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain comprises an aromatic ring which derives from the aromatic dicarboxylic acid. There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Further preference is given to PET and/or PBT which comprise, as other monomer units, up to 1% by weight, preferably up to 0.75% by weight, of 1,6-hexanediol and/or 2-methyl-1,5-pentanediol.

The viscosity number of the polyesters A) is generally in the range from 50 to 220, preferably from 80 to 160 (measured in 0.5% strength by weight solution in a phenol/o-dichlorobenzene mixture in a weight ratio of 1:1 at 25° C.) to ISO 1628.

Particular preference is given to polyesters whose carboxy end group content is up to 100 meq/kg of polyester, preferably up to 50 meq/kg of polyester and in particular up to 40 meq/kg of polyester. Polyesters of this type may be prepared, for example, by the process of DE-A 44 01 055. The carboxy end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET), if appropriate mixed with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are separated and purified and then melted and pelletized using an extruder. This usually facilitates handling and free flow, and metering for further steps in processing.

The recycled materials used may either be pelletized or in the form of ground material. The edge length should not be more than 10 mm, preferably less than 8 mm.

Because polyesters undergo hydrolytic cleavage during processing (due to traces of moisture) it is advisable to predry the recycled material. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

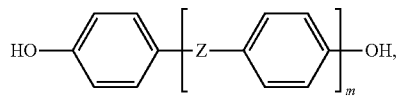

where Z is an alkylene or cycloalkylene group having up to 8 carbon atoms, an arylene group having up to 12 carbon atoms, a carbonyl group, a sulfonyl group, an oxygen atom or a sulfur atom, or a chemical bond, and m is from 0 to 2. The phenylene groups of the compounds may also have substitution by $C_1$-$C_6$-alkyl or alkoxy groups and fluorine, chlorine or bromine.

Examples of parent compounds for these compounds are dihydroxybiphenyl,
di(hydroxyphenyl)alkane,
di(hydroxyphenyl)cycloalkane,
di(hydroxyphenyl) sulfide,
di(hydroxyphenyl)ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol, and
hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, the term polyester also includes halogen-free polycarbonates. Examples of suitable halogen-free polycarbonates are those based on diphenols of the general formula

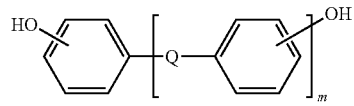

where Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the above formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

The suitable polycarbonates may be branched in a known manner, specifically and preferably by incorporating 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight-average) of from 10 000 to 200 000 g/mol, preferably from 20 000 to 80 000 g/mol.

The diphenols of the above general formula are known per se or can be prepared by known processes.

The polycarbonates may, for example, be prepared by reacting the diphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-comprising polycarbonates see, for example, DE-A 33 34 782.)

Examples of suitable chain terminators are phenol, p-tertbutylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A-35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free diphenols, of halogen-free chain terminators, and, if appropriate, of halogen-free branching agents. The content of low ppm amounts of hydrolyzable chlorine here, resulting by way of example from the preparation of the polycarbonates using phosgene in the interfacial process, not being regarded as halogen-comprising for the purposes of the invention.

These polycarbonates with ppm contents of hydrolyzable chlorine are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

Component B

According to the invention, at least one, or a mixture composed of two or more, for example from three to five, terpolymers of different structure, for example branched or linear, or of different monomeric constitution, e.g. random or block-type, is used as component B. Among these, a terpolymer of one type is preferably used as component B. Among the preferred terpolymers are those whose constitution is in essence linear and in essence random.

A vinylaromatic monomer or a mixture composed of two or more, e.g. from three to five, different vinylaromatic monomers, is used as monomeric unit b1). Examples of vinylaromatic monomers that can be used are styrene and substituted styrenes, such as $C_1$-$C_8$-alkyl-ring-alkylated styrenes, e.g. p-methylstyrene or tert-butylstyrene. Among these, particular preference is given to use of styrene and α-methylstyrene, or mixtures of these. Styrene alone is in particular used as b1).

The monomeric unit b2) from which the terpolymer B is obtainable can be a, or a mixture composed of two or more, e.g. from three to five, different $C_1$-$C_4$-alkyl (meth)acrylates, and among these it is preferable to use methyl methacrylate. However, it is also possible to use methacrylonitrile or acrylonitrile as b2). Furthermore, a mixture composed of one or more $C_1$-$C_4$-alkyl (meth)acrylates and methacrylonitrile and/or acrylonitrile can also be used as b2). Acrylonitrile alone is particularly preferably used as b2).

According to the invention, at least one monomer which comprises an α,β-unsaturated anhydride or, by way of example, a mixture composed of two or more, e.g. from three to five, of these monomers is used as monomeric unit b3) for preparation of the terpolymers B. Those that can be used are aromatic or else aliphatic compounds having at least one anhydride group. It is preferable to use monomers which do not have more than one anhydride group. Maleic anhydride is preferably used as b3).

According to the invention, the content of component b3) in the terpolymer is from 0.1 to 10% by weight, particularly preferably from 0.2 to 6% by weight, in particular from 0.2 to 4% by weight, based on the total weight of components b1) to b3), the entirety of which is 100% by weight. The content of the two other components b1) and b2) can vary widely and depends mainly on the required miscibility of component A. The content of component b1) is generally from 60 to 94.9% by weight, preferably from 61.5 to 89.9% by weight, in particular from 68 to 84.9% by weight, based on the total weight of components b1) to b3), the entirety of which is 100% by weight. Accordingly, the amount present of component b2) in the terpolymers is from 5 to 36% by weight, preferably from 10 to 35% by weight, in particular from 15 to 29% by weight.

The molar mass of the terpolymer can vary widely. Average molar masses in the range from 60 000 to 350 000 g/mol have proven suitable. Molar masses in the range from 80 000 to 300 000 g/mol are often advantageous. Particularly preferred terpolymers have molar masses in the range from 90 000 to 210 000 g/mol. The molar masses given above here are weight averages, determined by means of GPC, as described above.

Various processes can be used for preparation of the terpolymers B, as a function of the desired structural constitution. The terpolymers are preferably prepared via free-radical polymerization, particularly preferably via continuous solution polymerization. To this end, by way of example, the monomers can be dissolved in methyl ethyl ketone, and the polymerization reaction can be initiated thermally, or, if desired or required, an initiator such as a peroxide can be added to this solution. The reaction mixture is generally polymerized for two or more hours at an elevated temperature and then worked up.

The content of component B in the inventive molding compositions is generally matched to the requirements placed upon the product. The inventive molding compositions preferably comprise from 0.1 to 50% by weight, particularly preferably from 0.5 to 20% by weight, in particular from 1 to 15% by weight, of the terpolymer B, based on the total weight of components A to C.

The inventive molding compositions can comprise, as component C), from 0 to 60% by weight, in particular up to 50% by weight, of other additives and processing aids.

The inventive molding compositions may comprise, as component C), from 0 to 5% by weight, preferably from 0.05 to 3% by weight, and in particular from 0.1 to 2% by weight, of at least one ester or amide of saturated or unsaturated aliphatic carboxylic acids having from 10 to 40, preferably from 16 to 22, carbon atoms with saturated aliphatic alcohols or amines having from 2 to 40, preferably from 2 to 6, carbon atoms.

The carboxylic acids may be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono- di- or triamines. Examples of these are stearylamine, ethylenediamine, propylenediamine, hexamethylenediamine, di(6-aminohexyl)amine, particular preference being given to ethylenediamine and hexamethylenediamine. Correspondingly, preferred esters or amides are glyceryl distearate, glyceryl tristearate, ethylenediamine distearate, glyceryl monopalmitate, glyceryl trilaurate, glyceryl monobehenate, and pentaerythritol tetrastearate.

It is also possible to use mixtures of various esters or amides, or esters with amides combined, the mixing ratio here being as desired.

Examples of other usual additives C) are up to 40% by weight, preferably up to 30% by weight, of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1

(Georg-Thieme-Verlag, Stuttgart, 1961), pages 392 to 406 and in the monograph by C. B. Bucknall, "Toughened Plastics" (Applied Science Publishers, London, 1977).

Some preferred types of these elastomers are described below.

Preferred elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentanediene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkylnorbornenes, such as 5-ethylidene-2-norbornene, 5-butylidene-2-norbornene, 2-methallyl-5-norbornene and 2-isopropenyl-5-norbornene, and tricyclodienes, such as 3-methyl-tricyclo(5.2.1.0.$^{2.6}$)-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formula I, II, III or IV:

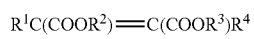 (I)

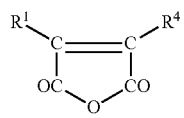 (II)

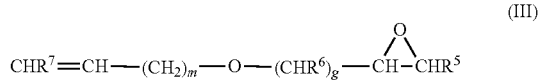 (III)

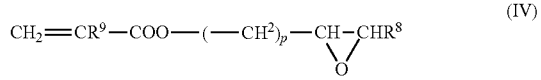 (IV)

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid, and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

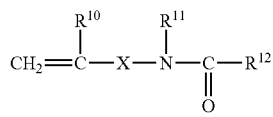

where the substituents may be defined as follows:
$R^{10}$ is hydrogen or a $C_1$-$C_4$-alkyl group,
$R^{11}$ is hydrogen or a $C_1$-$C_8$-alkyl group or aryl group, in particular phenyl,
$R^{12}$ is hydrogen, a $C_1$-$C_{10}$-alkyl group, $C_6$-$C_{12}$-aryl group or —$OR^{13}$
$R^{13}$ is a $C_1$-$C_8$-alkyl group or $C_6$-$C_{12}$-aryl group, if appropriate with substitution by O- or N-comprising groups,
X is a chemical bond or $C_1$-$C_{10}$-alkylene group or $C_6$-$C_{12}$-arylene group-, or

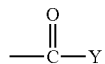

Y is O—Z or NH—Z, and
Z is a $C_1$-$C_{10}$-alkylene group or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

These graft polymers, in particular ABS polymers and/or ASA polymers, are preferably used in amounts of up to 40% by weight for the impact-modification of PBT, if appropriate in a mixture with up to 40% by weight of polyethylene terephthalate. Blend products of this type are obtainable with the trademark Ultradur® S (previously Ultrablend® S from BASF AG).

Instead of graft polymers whose structure has more than one shell, it is also possible to use homogeneous, i.e. single-shell, elastomers composed of 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

Fibrous or particulate fillers C) which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular up to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

Particular preference is given to mixtures of glass fibers C) with component B) in a ratio of from 1:100 to 1:2, preferably from 1:10 to 1:3.

The fibrous fillers may have been surface-pretreated with a silane compound to improve compatibility with the thermoplastic.

Suitable silane compounds have the general formula:

$$(X-(CH_2)_n)_k-Si-(O-C_mH_{2m+1})_{4-k}$$

where the substituents are as defined above:

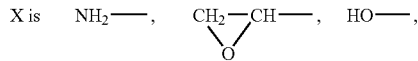

n is a whole number from 2 to 10, preferably 3 to 4
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface coating are from 0.05 to 5% by weight, preferably from 0.5 to 1.5% by weight and in particular from 0.8 to 1% by weight (based on D)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk.

The inventive molding compositions preferably comprise talc as component C), this being a hydrated magnesium silicate whose constitution is $Mg_3[(OH)_2/Si_4O_{10}]$ or $3 MgO.4SiO_2.H_2O$. This compound is known as a three-layer phyllosilicate, and has triclinic, monoclinic, or rhombic crystal structure, with lamellar habit. Other trace elements that can be present are Mn, Ti, Cr, Ni, Na, and K, and the OH group here may have been replaced to some extent by fluoride.

It is particularly preferable that 99.5% of the particle sizes of the talc used are <20 μm. The particle size distribution is usually determined via sedimentation analysis, DIN 6616-1, and is preferably:
<20 μm 99.5% by weight
<10 μm 99% by weight
<5 μm 85% by weight
<3 μm 60% by weight
<2 μm 43% by weight Products of this type are commercially available in the form of Micro-Talc I.T. extra (Omya). The amounts of talc present in the molding compositions are from 0.01 to 20% by weight.

As component C), the thermoplastic molding compositions of the invention may comprise the usual processing aids, such as stabilizers, oxidation retarders, agents to counteract decomposition due to heat and decomposition due to ultraviolet light, lubricants and mold-release agents, colorants, such as dyes and pigments, nucleating agents, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc.

Other lubricants and mold-release agents are usually used in amounts of up to 1% by weight. Preference is given to long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), or calcium montanate or sodium montanate, or low-molecular-weight polyethylene waxes or low-molecular-weight polypropylene waxes.

Examples of plasticizers which may be mentioned are dioctyl phthalates, dibenzyl phthalates, butyl benzyl phthalates, hydrocarbon oils and N-(n-butyl)benzene-sulfonamide.

The inventive molding compositions may also comprise from 0 to 2% by weight of fluorine-comprising ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-comprising ethylene polymers have homogeneous distribution in the molding compositions and preferably have a particle size $d_{50}$ (numeric average) in the range from 0.05 to 10 μm, in particular from 0.1 to 5 μm. These small particle sizes can particularly preferably be achieved by the use of aqueous dispersions of fluorine-comprising ethylene polymers and the incorporation of these into a polyester melt.

The inventive thermoplastic molding compositions may be prepared by methods known per se, by mixing the starting components in conventional mixing apparatus, such as screw extruders, Brabender mixers or Banbury mixers, and then extruding them. The extrudate may then be cooled and comminuted. It is also possible to premix individual components and then to add the remaining starting materials individually and/or likewise in a mixture. The mixing temperatures are generally from 230 to 290° C.

In another preferred procedure, components B) and, if appropriate, C) may be mixed with a prepolymer, compounded, and pelletized. The resultant pellets are then solid-phase condensed under an inert gas continuously or batchwise at a temperature below the melting point of component A) until the desired viscosity has been reached.

The inventive thermoplastic molding compositions for lighting elements feature good dimensional stability together with good mechanical properties.

They are suitable for production of lighting elements of any type, in particular for applications as headlamp parts, lamp parts, panels or constituents of these, headlamp panels or constituents of these, lamp panels or constituents of these, side cladding, panelling, structural parts in lighting systems, or are external lighting installations or constituents of these, or are boat bodies, lawnmower casings, motorcycle parts, where these comprise lighting elements.

EXAMPLES

Component A/1

Polybutylene terephthalate whose viscosity number VN is 130 ml/g and whose carboxy end group content is 34 meq/kg (Ultradur® B 4500 from BASF AG) (VN measured in 0.5% strength by weight solution composed of phenol/o-dichlorobenzene), 1:1 mixture) at 25° C.

Component A/2

PBT see A/1, with VN of 105 ml/g (Ultradur® B 2550 from BASF AG).

Component B

Terpolymer based on styrene/acrylonitrile/MA in the ratio 68/29.9/2.1, VN (0.5% strength in DMF at 25° C.) of 65 ml/g.

Component C/1

Pentaerythritol tetrastearate (Loxiol® 1206 from Cognis)

Component C/2

Talc

The components were processed by extrusion at 260° C.

To test mechanical properties, dumbbell specimens were produced to ISO 527-2 and impact resistance was determined to ISO 179-1. Gloss was measured at 20° C. and 60° angle to DIN 67530 on injection-molded plaques of dimensions 60×60×2 mm and shrinkage was determined to ISO 294, and fogging was tested to DIN 75201, 100° C., 16 h.

The constitutions of the molding compositions and the results of the measurements are given in the table.

TABLE

|  | 1 | 2 | 3 | 4 |
|---|---|---|---|---|
| Component A/1 | 94.80 | 94.80 | 64.80 | 61.62 |
| Component A/2 |  |  | 34.90 | 33.18 |
| Component B |  | 5.00 |  | 5.00 |
| Component C/1 | 0.20 | 0.20 | 0.20 | 0.20 |
| Component C/2 |  | 5.00 | 0.10 |  |
| VN (DIN 53728) | 123.2 | 122.4 | 115.1 | 118.1 |
| Fogging test to DIN 75201 100° C., 16 h [mg] | 0.18 | 0.09 | 0.15 | 0.00 |
| Gloss assessment to DIN 67530 | | | | |
| 20° | 71 | 80 | 70 | 82 |
| 60° | 90 | 98 | 94 | 98 |
| Mechanical properties | | | | |
| Max. stress: ISO 527 (N/mm) | 57.1 | 58.1 | 60 | 58.7 |
| Tensile strain at yield (%) | 3.6 | 3.6 | 9.3 | 3.7 |
| Tensile strain at break (%) | 35.2 | 54.2 | 16.8 | 31.6 |
| Modulus of elasticity: ISO 527 (N/mm) | 2518 | 2560 | 2678 | 2567 |
| Impact resistance −30° C. ISO 179-2 (kJ/m²) | 140 | 127 | 142 | 123 |
| Shrinkage (60 × 60 × 2 mm) ISO 294 width proximal | 1.646 | 1.398 | 1.992 | 1.454 |
| 23° C./16-24 h (in mm) width distal | 2.041 | 1.0834 | 2.545 | 1.841 |

The invention claimed is:

1. A headlamp part for automobile applications composed of thermoplastic molding compositions, consisting of
   A) from 10 to 99.9% by weight of at least one thermoplastic polyester,
   B) from 0.1 to 50% by weight of at least one terpolymer, obtainable from
      b1) at least one vinylaromatic monomer,
      b2) at least one $C_1$-$C_4$-alkyl (meth)acrylate or (meth)acrylonitrile, and
      b3) from 0.1 to 10% by weight, based on the total weight of components b1) to b3), of at least one monomer which comprises an $\alpha,\beta$-unsaturated anhydride, and
   C) from 0 to 60% by weight of other additives, wherein component C comprises a compound selected from the group consisting of esters or amides of saturated or unsaturated aliphatic carboxylic acids having from 10 to 40 carbon atoms with saturated aliphatic alcohols or amines having from 2 to 40 carbon atoms, elastomeric polymers, fibrous or particulate fillers, acicular mineral fillers, talc, processing aids, and combinations thereof and wherein component C does not comprise rubber,
where the total of the percentages by weight of components A) to C) is 100%; and where the thermoplastic molding composition has a fogging value between 0 and 0.09 according to fogging test DIN 75201.

2. The headlamp part according to claim 1, in which the content of b3) is from 0.2 to 6% by weight.

3. The headlamp part according to claim 1, in which the molding compositions comprise, as component C1), an ester or an amide of saturated or unsaturated aliphatic carboxylic acids having from 10 to 40 carbon atoms with saturated aliphatic alcohols or amines having from 2 to 40 carbon atoms.

4. The headlamp part according to claim 1, where the headlamp parts are: lamp parts, headlamp covers or constituents of these, lamp panels or constituents of these, or headlamp parts in side cladding.

5. The headlamp part according to claim 2, in which the molding compositions comprise, as component C1), an ester or an amide of saturated or unsaturated aliphatic carboxylic acids having from 10 to 40 carbon atoms with saturated aliphatic alcohols or amines having from 2 to 40 carbon atoms.

6. The headlamp part according to claim 2, where the headlamp parts are: lamp parts, headlamp covers or constituents of these, lamp panels or constituents of these, or headlamp parts in side cladding.

7. The headlamp part according to claim 3, where the headlamp parts are: lamp parts, headlamp covers or constituents of these, lamp panels or constituents of these, or headlamp parts in side cladding.

8. The headlamp part according to claim 5, where the headlamp parts are: lamp parts, headlamp covers or constituents of these, lamp panels or constituents of these, or headlamp parts in side cladding.

9. The headlamp part according to claim 1, wherein component C does not comprise fibrous or particulate fillers.

* * * * *